United States Patent
Yang et al.

(10) Patent No.: US 9,456,077 B2
(45) Date of Patent: Sep. 27, 2016

(54) COMMUNICATION SERVER, COMMUNICATION TERMINAL, AND METHOD OF COMMUNICATION

(71) Applicant: LINE Corporation, Tokyo (JP)

(72) Inventors: Heechan Yang, Tokyo (JP); Kenichi Sugimoto, Tokyo (JP)

(73) Assignee: LINE Corporation, Tokyo (JP)

( * ) Notice: Subject to any disclaimer, the term of this patent is extended or adjusted under 35 U.S.C. 154(b) by 0 days.

(21) Appl. No.: 14/702,642

(22) Filed: May 1, 2015

(65) Prior Publication Data

US 2015/0326713 A1    Nov. 12, 2015

(30) Foreign Application Priority Data

May 7, 2014 (JP) .................................. 2014-095703

(51) Int. Cl.

| | |
|---|---|
| *H04L 12/66* | (2006.01) |
| *H04L 12/50* | (2006.01) |
| *H04L 12/28* | (2006.01) |
| *H04L 12/56* | (2006.01) |
| *H04M 3/42* | (2006.01) |
| *H04L 12/64* | (2006.01) |

(52) U.S. Cl.
CPC ............ *H04M 3/42* (2013.01); *H04L 12/6418* (2013.01); *H04M 3/42042* (2013.01)

(58) Field of Classification Search
CPC .... H04M 1/72561; H04M 1/56; H04M 1/57; H04M 1/575; H04M 3/42263; H04M 7/006; H04M 15/06; H04M 2203/1008; H04M 2203/105; H04M 2203/2016; H04M 2207/18; H04M 2242/22; H04L 29/06027; H04L 65/1006; H04L 65/1069

USPC ............ 379/142.01, 142.04, 142.06, 142.09, 379/142.17, 245–247, 355.02, 355.04, 379/355.05, 355.09, 356.01, 201.01, 379/201.02, 219, 221.02, 221.08, 229, 230, 379/242, 243; 370/355, 357, 401

See application file for complete search history.

(56) References Cited

U.S. PATENT DOCUMENTS

| | | | |
|---|---|---|---|
| 8,503,640 | B1 | 8/2013 | Tovino et al. |
| 8,972,559 | B2 * | 3/2015 | Sutcliffe ................. H04M 1/57 709/217 |
| 2001/0049745 | A1 * | 12/2001 | Schoeffler ............... H04L 51/14 709/238 |
| 2002/0069254 | A1 * | 6/2002 | Watanabe ............... H04L 51/28 709/206 |

(Continued)

FOREIGN PATENT DOCUMENTS

| | | |
|---|---|---|
| JP | 2009-272668 A | 11/2009 |
| KR | 10-2009-0017773 A | 2/2009 |

OTHER PUBLICATIONS

Korean Office Action issued on Aug. 22, 2016 by the Korean Patent Office corresponding to Korean Patent Application No. 10-2015-0063396.

*Primary Examiner* — Binh Tieu
(74) *Attorney, Agent, or Firm* — Typha IP LLC

(57) ABSTRACT

A communication server includes a receiving unit for receiving a first terminal ID and a second terminal number from a first terminal via an IP network, a search unit for searching for the first terminal ID and the second terminal number in a database, and a notification unit for, upon detection of a specific phone number specifying the first terminal, notifying the second terminal of the specific phone number, using the second terminal number as an addressee, the specific phone number being associated with the first terminal ID and the second terminal number.

12 Claims, 15 Drawing Sheets

(56) References Cited

U.S. PATENT DOCUMENTS

| | | |
|---|---|---|
| 2004/0208302 A1 | 10/2004 | Urban et al. |
| 2005/0243807 A1* | 11/2005 | Lin ................... H04L 29/12009 370/352 |
| 2005/0281393 A1* | 12/2005 | Kubo ................ H04M 3/42195 379/88.01 |
| 2007/0064918 A1* | 3/2007 | Son ................... H04L 29/06027 379/355.01 |
| 2007/0127656 A1* | 6/2007 | Citron ..................... H04M 1/56 379/142.01 |
| 2007/0146476 A1* | 6/2007 | Son ....................... H04M 7/006 348/14.01 |
| 2009/0247188 A1 | 10/2009 | Ridley et al. |

\* cited by examiner

FIG. 7

| | FIRST TERMINAL ID | SECOND TERMINAL NUMBER | SPECIFIC PHONE NUMBER |
|---|---|---|---|
| 611 | aaa | 090-XXXX-XXXX | 090-AAAA-AAAA |
| 612 | bbb | 090-XXXX-XXXX | 090-BBBB-BBBB |
| 613 | ccc | 090-XXXX-XXXX | 090-CCCC-CCCC |
| 614 | ddd | 090-YYYY-YYYY | 090-AAAA-AAAA |
| 615 | eee | 090-YYYY-YYYY | 090-BBBB-BBBB |
| 616 | fff | 090-YYYY-YYYY | 090-CCCC-CCCC |
| 617 | ccc | 090-ZZZZ-ZZZZ | 090-AAAA-AAAA |
| 618 | aaa | 090-ZZZZ-ZZZZ | 090-BBBB-BBBB |
| 619 | ddd | 090-ZZZZ-ZZZZ | 090-CCCC-CCCC |
| | ... | ... | ... |

600
601 602 603

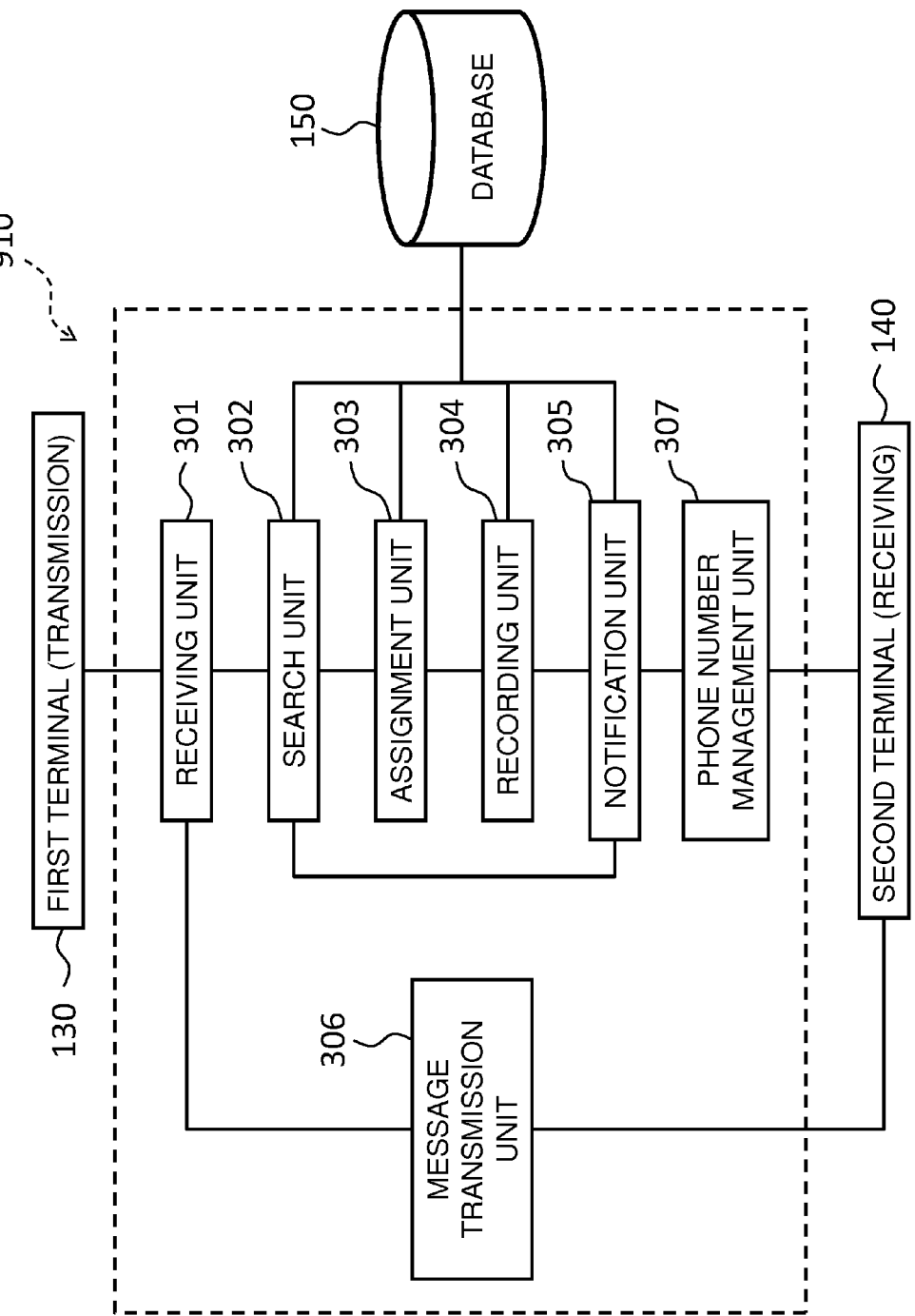

COMMUNICATION SERVER, COMMUNICATION TERMINAL, AND METHOD OF COMMUNICATION

CROSS-REFERENCE TO RELATED APPLICATIONS

This application is based upon and claims the benefit of priority from the prior Japanese Patent Application No. 2014-095703, filed on May 7, 2014, the entire contents of which are incorporated herein by reference.

FIELD

The present invention relates to a technology for connecting communication terminals to each other via a VoIP system and a PSTN.

BACKGROUND

The Internet, which is conventionally used simply as a tool for data transmission, for example, for accessing websites or transmitting electronic mails, is recently applied also for voice communication services, which require a high communication quality for data transmission and a high real-time property. Among such voice communication services, VoIP (Voice over Internet Protocol) systems including IP (Internet Protocol) phone systems using Internet technologies have been put into practice along with the spread of the broadband.

VoIP is a transmission technology for transmitting and receiving voices via an IP network by use of the Internet Protocol (IP). A representative example of VoIP is an IP phone technology. An IP phone service provides voice communication using an IP network of a communication carrier. Communication carriers each have an IP network configured exclusively for the IP phone service in order to keep the quality of the IP phone service high. As described in, for example, Japanese Laid-Open Patent Publication No. 2009-272668, a user of an IP phone is assigned a phone number (e.g., number starting with "050") for the IP phone by a communication carrier of the IP phone service. Such a user can perform voice transmission and receiving with another IP phone as well as with a landline phone using an existing public switched telephone network (PSTN).

However, with such an IP phone service, information on a transmission terminal which transmitted a conversation request signal may not be notified correctly to a receiving terminal, depending on the standards of the communication carriers or the specifications of the IP phone terminal which transmits or receives the signal. According to one alternative to the above-described system, each communication carrier acquires phone numbers in the PSTN and assigns one such phone number to each transmission terminal. However, with this system, there is a limit on the number of phone numbers which can be assigned because the cost for acquiring the phone numbers and maintaining the acquired phone numbers is high. That is, this system has a problem that the cost is increased as the number of users is increased.

SUMMARY

A communication server in an embodiment according to the present invention includes a receiving unit configured to receive a first terminal ID and a second terminal number from a first terminal transmitting a conversation request signal via an IP network, the second terminal number being a phone number in a PSTN (public switched telephone network) of a second terminal receiving the conversation request signal, a search unit configured to search for a specific phone number for the first terminal in use of the first terminal ID and the second terminal number in a database, the database including a plurality of phone numbers of a plurality of terminals, a plurality of ID information for the plurality of terminals, and specific phone numbers associated with the plurality of phone numbers and the plurality of ID information, and a notification unit configured to notify the second terminal of the specific phone number.

In another embodiment, the first terminal ID may include inherent information used for identifying a corresponding terminal.

In still another embodiment, the notification unit, upon detection of the specific phone number, may notify the second terminal of the specific phone number using the second terminal number as an addressee.

In still another embodiment, the communication server may further include an assignment unit configured to, in case when the specific phone number cannot be specified by the search unit, assign a specific phone number in association with the first terminal ID and the second terminal number, and a recording unit configured to record the first terminal ID, the second terminal number and the specific phone number in the database.

In still another embodiment, the notification unit may transmit the specific phone number to a communication carrier including a gateway between the PSTN and the IP network, using the second terminal number.

In still another embodiment, the communication server may further include a message transmission unit configured to transmit a first terminal number to the second terminal in the form of a message via an SMS server, the first terminal number being a phone number of the first terminal in the PSTN.

In still another embodiment, the communication server may further include a phone number management unit configured to switch the first terminal ID or the second terminal number in the database based on a notice from a user of the first terminal or a user of the second terminal.

A communication server in an embodiment according to the present invention connects a first terminal and a second terminal to each other via a communication carrier. The communication server includes a receiving unit configured to receive a specific phone number and a second terminal number from the second terminal via the communication carrier, the second terminal number being a phone number in a PSTN (public switched telephone network) of the second terminal transmitting a conversation request signal, the specific phone number specifying the first terminal receiving the conversation request signal, and the communication carrier including a gateway between the PSTN and an IP network, and a search unit configured to search for a first terminal ID related to the second terminal number and the specific phone number in a database, the database including a plurality of phone numbers of a plurality of terminals, a plurality of ID information for the plurality of terminals, and specific phone numbers associated with the plurality of phone numbers and the plurality of ID information.

A method of communication in an embodiment according to the present invention includes receiving a first terminal ID and a second terminal number from a first terminal transmitting a conversation request signal via an IP network, the second terminal number being a phone number in a PSTN (public switched telephone network) of a second terminal receiving the conversation request signal, searching for a specific phone number for the first terminal in use of the first terminal ID and the second terminal number in a database, the database including a plurality of phone numbers of a plurality of terminals, a plurality of ID information for the plurality of terminals, and specific phone numbers associated with the plurality of phone numbers and the plurality of ID information, and notifying the second terminal of the specific phone number.

In another embodiment, the first terminal ID may include inherent information used for identifying a corresponding terminal.

In still another embodiment, the method of communication may include notifying the second terminal of the specific phone number includes notifying, upon detection of the specific phone number, the second terminal of the specific phone number using the second terminal number as an addressee.

In still another embodiment, the method of communication may further include, in case when the specific phone number cannot be specified, assigning a specific phone number in association with the first terminal ID and the second terminal number, and recording the first terminal ID, the second terminal number and the specific phone number in the database.

In still another embodiment, the method of communication may further include, transmitting the specific phone number to a communication carrier including a gateway between the PSTN and the IP network, using the second terminal number.

In still another embodiment, the method of communication may further include, transmitting a first terminal number to the second terminal in the form of a message via an SMS server, the first terminal number being a phone number of the first terminal in the PSTN.

In still another embodiment, the method of communication may further include, switching the first terminal ID or the second terminal number in the database based on a notice from a user of the first terminal or a user of the second terminal.

A communication terminal in an embodiment according to the present invention includes a control unit including a CPU configured to execute a program in accordance with an instruction signal and a memory configured to store a first terminal ID and a second terminal number, the first terminal ID being an ID of the communication terminal transmitting a conversation request signal via an IP network, and the second terminal number being a phone number in a PSTN (public switched telephone network) of a second terminal receiving the conversation request signal and a communication module controlled by the control unit and configured to transmit the first terminal ID and the second terminal number to a communication server via the IP network, the communication server being connected to a database storing the first terminal ID and the second terminal number in association with a specific phone number, and the specific phone number being transmitted to the second terminal.

In another embodiment, the first terminal ID may include inherent information used for identifying a corresponding terminal.

In still another embodiment, the specific phone number may be transmitted to the second terminal with the second terminal number being used as an addressee.

In still another embodiment, the memory may store a first terminal number, the first terminal number being a phone number of the communication terminal in the PSTN, and the communication module may transmit the first terminal number to the communication server via the IP network, and the first terminal number is notified to the second terminal in the form of a message.

In still another embodiment, the communication module may receive the first terminal number notified in the form of a message.

A communication terminal in an embodiment according to the present invention includes a control unit including a CPU configured to execute a program in accordance with an instruction signal and a memory configured to store a specific phone number and a second terminal number, the specific phone number being a phone number specifying a first terminal receiving a conversation request signal, and a second terminal number being a phone number in a PSTN (public switched telephone network) of the communication terminal transmitting the conversation request signal, and a communication module controlled by the control unit and configured to transmit the specific phone number and the second terminal number to a communication server via a communication carrier, the communication carrier including a gateway between the PSTN and an IP network, the communication server being connected to a database storing a first terminal ID and the second terminal number in association with the specific phone number, and the first terminal and the communication terminal being connected to each other via the communication carrier.

A method of communication using a communication terminal in an embodiment according to the present invention includes storing a first terminal ID and a second terminal number, the first terminal ID being an ID of the communication terminal transmitting a conversation request signal via an IP network, and the second terminal number being a phone number in a PSTN (public switched telephone network) of a second terminal receiving the conversation request signal, and transmitting the first terminal ID and the second terminal number to a communication server via the IP network, the communication server being connected to a database storing the first terminal ID and the second terminal number in association with a specific phone number, and the specific phone number being transmitted to the second terminal.

In another embodiment, the first terminal ID may include inherent information used for identifying a corresponding terminal.

In still another embodiment, the specific phone number may be transmitted to the second terminal with the second terminal number being used as an addressee.

In still another embodiment, the method of communication may further include storing a first terminal number, the first terminal number being a phone number of the communication terminal in the PSTN, transmitting the first terminal number to the communication server via the IP network, and notifying the first terminal number to the second terminal in the form of a message.

In still another embodiment, the method of communication may further include, receiving the first terminal number notified in the form of a message.

A method of communication using a communication terminal in an embodiment according to the present invention includes storing a specific phone number and a second terminal number, the specific phone number being a phone number specifying a first terminal receiving a conversation request signal, and the second terminal number being a phone number in a PSTN (public switched telephone network) of the communication terminal transmitting the conversation request signal, and transmitting the specific phone number and the second terminal number to a communication server via a communication carrier, the communication carrier including a gateway between the PSTN and an IP network, the communication server being connected to a database storing a first terminal ID and the second terminal number in association with the specific phone number, and the first terminal and the communication terminal being connected to each other via the communication carrier.

BRIEF DESCRIPTION OF DRAWINGS

FIG. 7 shows an example of TNT table stored in a database in the voice communication system in embodiment 1 according to the present invention;

FIG. 15 is a block diagram showing a functional structure of a communication server in a voice communication system in embodiment 4 according to the present invention.

DESCRIPTION OF EMBODIMENTS

Figure 1:
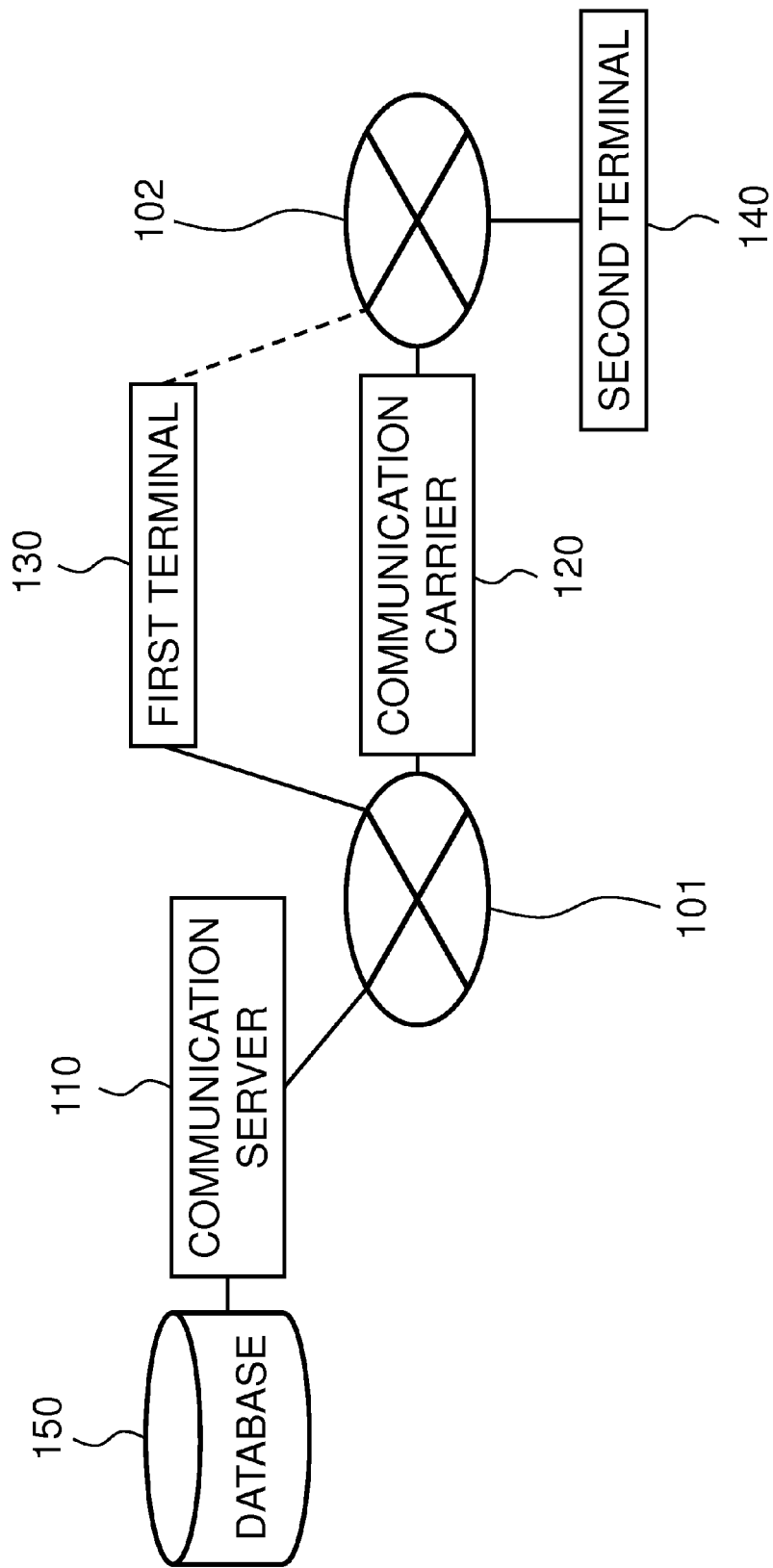
FIG. 1 is a block diagram showing a structure of a voice communication system in embodiment 1 according to the present invention.

Hereinafter, a communication server and a communication terminal according to the present invention will be described with reference to the drawings. It should be noted that the communication server and the communication terminal according to the present invention may be carried out in many different forms, and are not to be interpreted as being limited to the following embodiments. In the drawings referred to in the following embodiments, elements which are the same or which have the same functions will bear identical reference signs, and the descriptions thereof will not be repeated.

Embodiment 1

With reference to FIG. 1 through 6, a voice communication system in embodiment 1 according to the present invention, and a communication server and a communication terminal also in embodiment 1 according to the present invention usable for the voice communication system will be described in detail.

<Overview of the System>

FIG. 1 is a block diagram showing a structure of a voice communication system 100 in embodiment 1 according to the present invention. As shown in FIG. 1, the voice communication system 100 includes a communication server 110, a communication carrier 120, and a first terminal 130, which is a transmission terminal. The communication server 110, the communication carrier 120, and the first terminal 130 are connected to each other via an IP network 101 such as the Internet or the like. The communication carrier 120 and a second terminal 140, which is a receiving terminal, are connected to each other via a PSTN 102. The communication server 110 is connected to a database 150. The communication server 110 and the database 150 may be connected to each other via the IP network 101. The first terminal 130 may be connected to the PSTN 102.

The communication server 110 is used to associate two or more communication applications to each other or terminate the association (for example, the communication server 110 starts or discontinues such a communication) in order to provide a communication of various types of data including voice data, video data and the like via the IP network 101. The communication server 110 may be of, for example, a session initiation protocol (SIP). Specifically, the communication server 110 operates as follows. Upon receipt of a conversation request signal from the first terminal 130 via the IP network 101, the communication server 110 transmits the request signal to the second terminal 140 via the IP network 101, the communication carrier 120 and the PSTN 102, and thus communicably connects the first terminal 130 and the second terminal 140 to each other via the communication carrier 120.

The communication carrier 120 includes a gateway between the IP network 101 and the PSTN 102, and provides a voice communication service. The gateway allows the first terminal 130 and the second terminal 140 to be communicably connected to each other via the IP network 101 and the PSTN 102. In the example shown in FIG. 1, the IP network 101 and the PSTN 102 are commonly managed by one communication carrier 120. The voice communication system 100 is not limited to having such a system, and the IP network 101 and the PSTN 102 may be managed by different communication carriers.

The first terminal 130 is a communication terminal connectable with at least the IP network 101, and the second terminal 140 is a communication terminal connectable with at least the PSTN 102. Alternatively, the first terminal 130 and the second terminal 140 may have substantially the same function, and may be connectable with both of the IP network 101 and the PSTN 102. Herein, for the convenience of explanation of the voice communication system, the terminal of a transmitting user who transmits a conversation request signal will be referred to as the "first terminal 130", and the terminal of a receiving user who receives the request signal will be referred to as the "second terminal 140".

The first terminal 130 merely needs to be connectable with at least the IP network 101 like, for example, a tablet PC, and may not need to be connectable with the PSTN 102. The second terminal 140 merely needs to be connectable with at least the PSTN 102 like, for example, a mobile phone or a landline phone, and may not need to be connectable with the IP network 101. Needless to say, the first terminal 130 and the second terminal 140 may be communication terminals connectable with both of the IP network 101 and the PSTN 102, like a smart phone.

The database 150 stores a plurality of pieces of inherent information (IDs) on a plurality of communication terminals in a communication service related to the communication server 110, and phone numbers of a plurality of communication terminals in the PSTN 102. The communication service related to the communication server 110 may be a social network service (hereinafter, referred to simply as an "SNS") managed by the communication server 110. Hereinafter, unless otherwise specified, "ID" represents inherent information in an SNS, and the "phone number" or "XX number" represents a phone number in the PSTN 102. The database 150 includes a translator (TNT; Telephone Number Translator) table in which a specific phone number is assigned to a combination of an ID and a phone number of different communication terminals. The TNT table will be described later in detail.

<Hardware Structure of the Communication Server>

Figure 2:
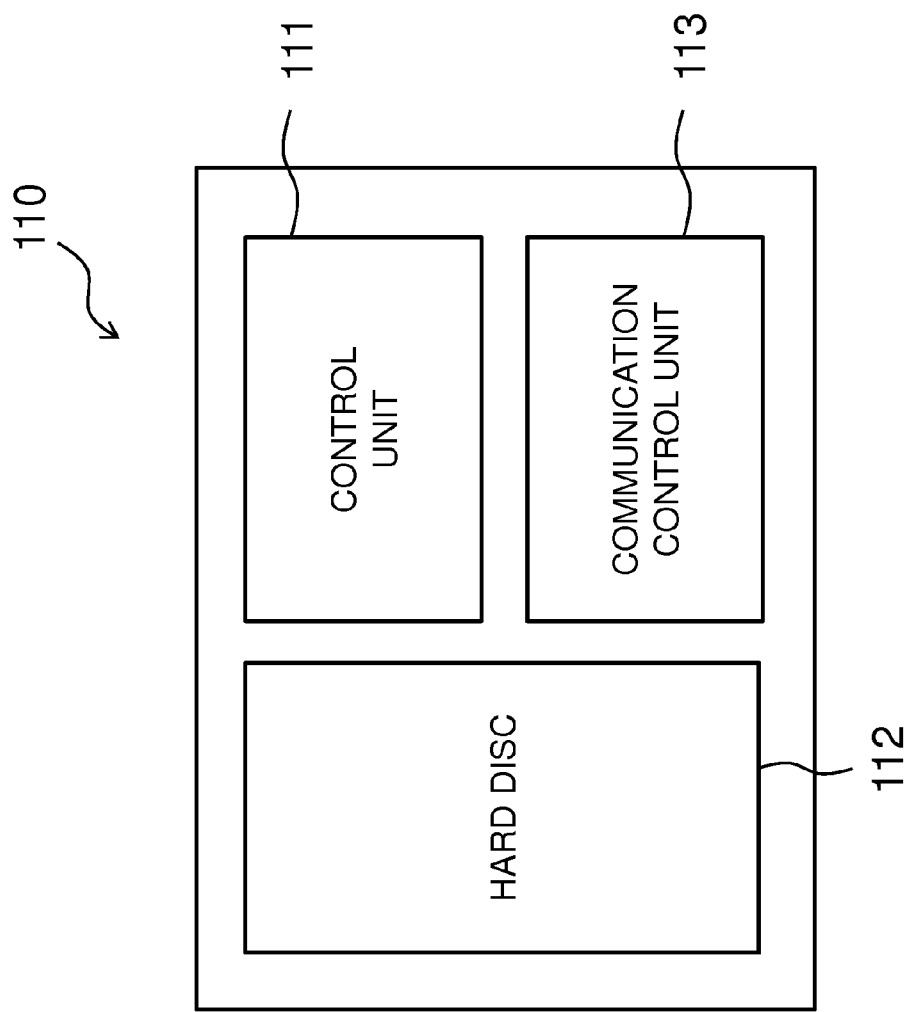
FIG. 2 is a schematic view showing a hardware structure of a communication server usable for the voice communication system in embodiment 1 according to the present invention.

FIG. 2 is a schematic view showing a hardware structure of the communication server 110 usable in the voice communication system 100 in embodiment 1 according to the present invention. As shown in FIG. 2, the communication server 110 includes a control unit 111, a hard disc 112, and a communication control unit 113. The control unit 111 includes a central processing unit (CPU) and a storage device such as a register, a memory or the like. The control unit 111 executes a program stored on the memory by use of the CPU to perform a computation process in accordance with a command signal from the first terminal 130, the second terminal 140 or the like. The hard disc 112 is a memory capable of storing a large capacity of data, and stores, for example, programs necessary for computation processes. The hard disc 112 temporarily stores information transmitted from the first terminal 130 or the second terminal 140. The communication control unit 113 connects the communication server 110 and the IP network 101 to each other and controls data input and output. The storage device in the control unit 111 reads a program necessary for a computation process from the hard disc 112 when necessary, and stores the program thereon.

<Hardware Structure of the Communication Terminal>

Figure 3:
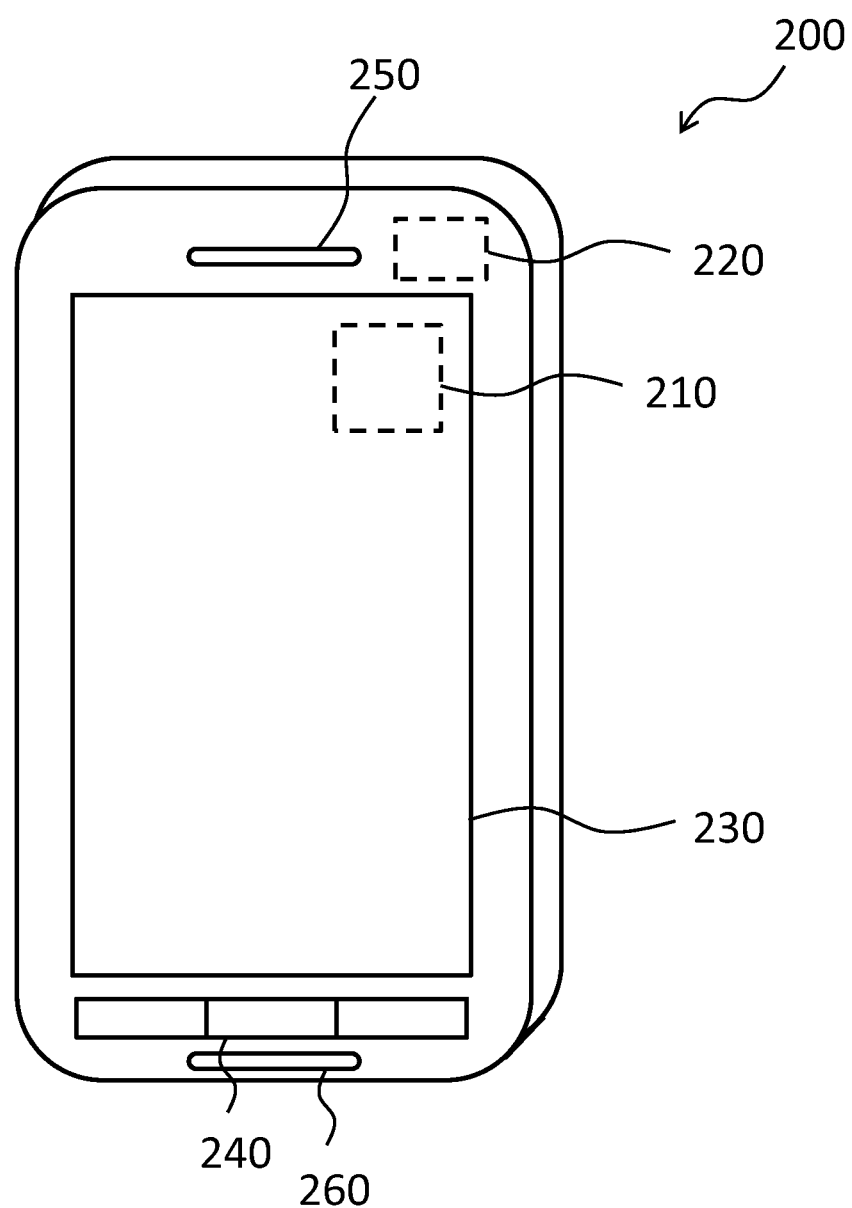
FIG. 3 is a schematic view showing a hardware structure of a communication terminal usable for the voice communication system in embodiment 1 according to the present invention.

FIG. 3 is a schematic view showing a hardware structure of a communication terminal 200 usable for the voice communication system 100 in embodiment 1 according to the present invention. As shown in FIG. 3, the communication terminal 200 includes a control unit 210 and a communication module 220 provided inside a main body thereof. The communication terminal 200 also includes a display 230, an operation button 240, a speaker 250 and a microphone 260 provided on one surface of the main body thereof. The display 230 may include a touch sensor, and the operation button 240 may not need to be provided.

The control unit 210 includes a CPU and a storage device such as a register, a memory or the like. The control unit 210 executes a program stored on the memory by use of the CPU to realize any of various functions of the communication terminal 200 in accordance with a command signal input by the user. The communication module 220 includes an antenna that transmits or receives a signal wirelessly, a high frequency circuit, a demodulation circuit and the like. The communication module 220 is controlled by the control unit 210 to be connected to a network and thus access the communication server 110.

The display 230 may be a liquid crystal display, an organic EL display or the like. The touch sensor may be of a resistance film type, an electrostatic capacitance type, an optical type or the like. The user follows an instruction shown on the display 230 to operate the communication terminal 200 and thus realizes any of the various functions.

In the voice communication system 100, the display 230 is used to display information on a transmission terminal, and the operation button 240 is used to select and determine an instruction signal to be transmitted to the communication server 110 from the communication terminal 200. The speaker 250 is used to transmit a voice signal transmitted thereto by the voice communication system 100 to the user as an acoustic wave, and the microphone 260 is used to receive an acoustic wave from the user.

Now, the control unit 210 in the case where the communication terminal 200 is used as the first terminal 130, which is a transmission terminal, will be described in detail. The communication terminal 200 includes the control unit 210 and the communication module 220.

The control unit 210 includes the CPU that executes a program in accordance with a command signal, and a memory storing a first terminal ID and a second terminal number. The "first terminal ID" is an ID of the first terminal 130 in the SNS, and the "second terminal number" is a phone number of the second terminal 140, which is a receiving terminal in the PSTN 102. The CPU realizes any of various functions of the communication terminal 200 in accordance with a command signal input by the user.

The communication module 220 is controlled by the control unit 210 to transmit the first terminal ID and the second terminal number to the communication server 110 via the IP network 101. The communication server 110 is connected to the database 150. The database 150 stores the first terminal ID and the second terminal number in association with a specific phone number. In other words, the database 150 includes a TNT table in which the first terminal ID, the second terminal number and the specific phone number are associated to one another. The specific phone number is transmitted to the second terminal 140 via the IP network 101, the communication carrier 120, and the PSTN 102, with the phone number of the second terminal 140 being used as an addressee.

<Functional Structure of the Communication Server>

Figure 4:
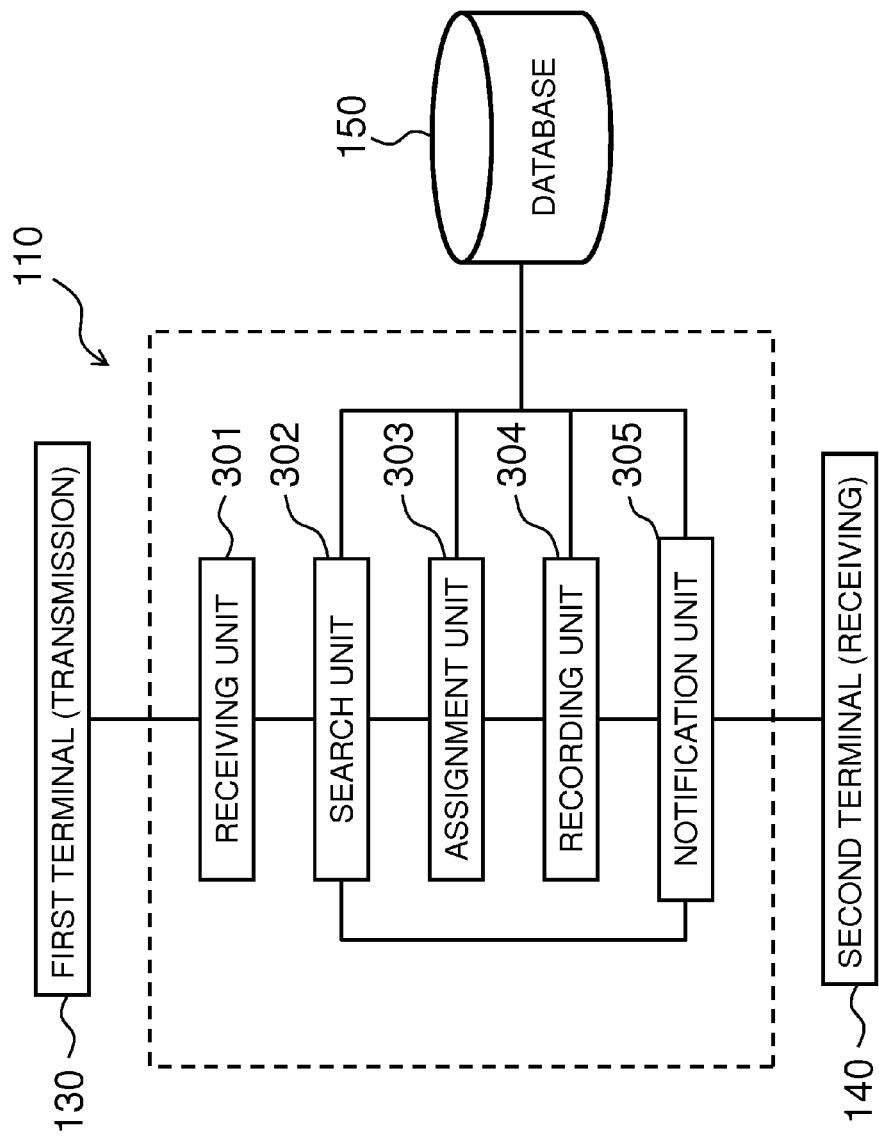
FIG. 4 is a block diagram showing a functional structure of the communication server in the voice communication system in embodiment 1 according to the present invention.

FIG. 4 is a block diagram showing a functional structure of the communication server 110 in the voice communication system 100 in embodiment 1 according to the present invention. With reference to FIG. 4, each of functions of the communication server 110 shown in FIG. 1 will be described in more detail. As shown in FIG. 4, the communication server 110 includes a receiving unit 301, a search unit 302, an assignment unit 303, a recording unit 304, and a notification unit 305.

The receiving unit 301 receives at least the first terminal ID, which is an ID in the SNS of the first terminal 130 that transmits a conversation request signal, and the second terminal number, which is a phone number in the PSTN of the second terminal 140 that receives a conversation request signal. The receiving unit 301 receives the first terminal ID and the second terminal number from the first terminal 130 via the IP network 101. The receiving unit 301 outputs the received first terminal ID and second terminal number to the search unit 302. In the case where the first terminal 130 has a first terminal number, which is a phone number thereof in the PSTN, the receiving unit 301 may receive the first terminal number together with the first terminal ID and the second terminal number.

The search unit 302 receives the first terminal ID and the second terminal number output from the receiving unit 301. The search unit 302 searches for the first terminal ID and the second terminal number in the database 150, which includes a plurality of phone numbers of a plurality of terminals in the PSTN, a plurality of IDs of a plurality of terminals in the SNS, and specific phone numbers associated with the plurality of phone numbers of the plurality of terminals and the plurality of IDs of the plurality of terminals. Herein, a combination of an ID and a phone number of different communication terminals, for example, a combination of the first terminal ID and the second terminal number, is called a "composite key". There are composite keys in a number equal to the number of combinations of first terminals and second terminals. In this example, a combination of an ID and a phone number of communication terminals is called a composite key. The composite key is not limited to being such a combination. For example, a composite key may be a combination of a plurality of pieces of information specifying a plurality of communication terminals. Alternatively, a composite key may be electronic information, separately created, that specifies a combination of a plurality of communication terminals.

In the case where the composite key of the first terminal ID and the second terminal number is detected in the database 150, the search unit 302 outputs a signal, indicating that the composite key is present in the database 150, to the notification unit 305. By contrast, in the case where the composite key of the first terminal ID and the second terminal number is not detected in the database 150, the search unit 302 outputs a signal, indicating that the composite key is not present in the database 150, to the assignment unit 303.

In the case where the signal indicating that the composite key is not present in the database 150 is input from the search unit 302, the assignment unit 303 assigns a specific phone number with which the second terminal 140 specifies the first terminal 130, using a combination of the first terminal ID and the second terminal number as a composite key. After assigning the specific phone number, the assignment unit 303 outputs the first terminal ID, the second terminal number, and the specific phone number assigned thereto to the recording unit 304. The specific phone number will be described in detail later.

The recording unit 304 records the first terminal ID, the second terminal number, and the specific phone number input from the assignment unit 303 in the TNT table in the database 150 in association with one another. Upon completion of the recording, the recording unit 304 outputs a signal, indicating that the recording has been completed, to the notification unit 350. The recording unit 304 may has a verify function of confirming that the first terminal ID, the second terminal number, and the specific phone number have been correctly recorded in the TNT table in the database 150.

Upon receipt of the signal indicating that the composite key is present in the database 150 from the search unit 302, or upon receipt of the signal indicating that the recording has been completed from the recording unit 304, the notification unit 305 notifies the second terminal 140 of the specific phone number corresponding to the composite key. In more detail, the notification unit 305 outputs the second terminal number and the specific phone number to the communication carrier 120 via the IP network 101. The communication carrier 120 outputs the specific phone number to the second terminal 140 via the PSTN 102, using the input second terminal number as an addressee. In this manner, the notification from the notification unit 305 to the second terminal 140 is performed via the IP network 101, the communication carrier 120 and the PSTN 102.

<Operation Flow of the Voice Communication System>

Figure 5:
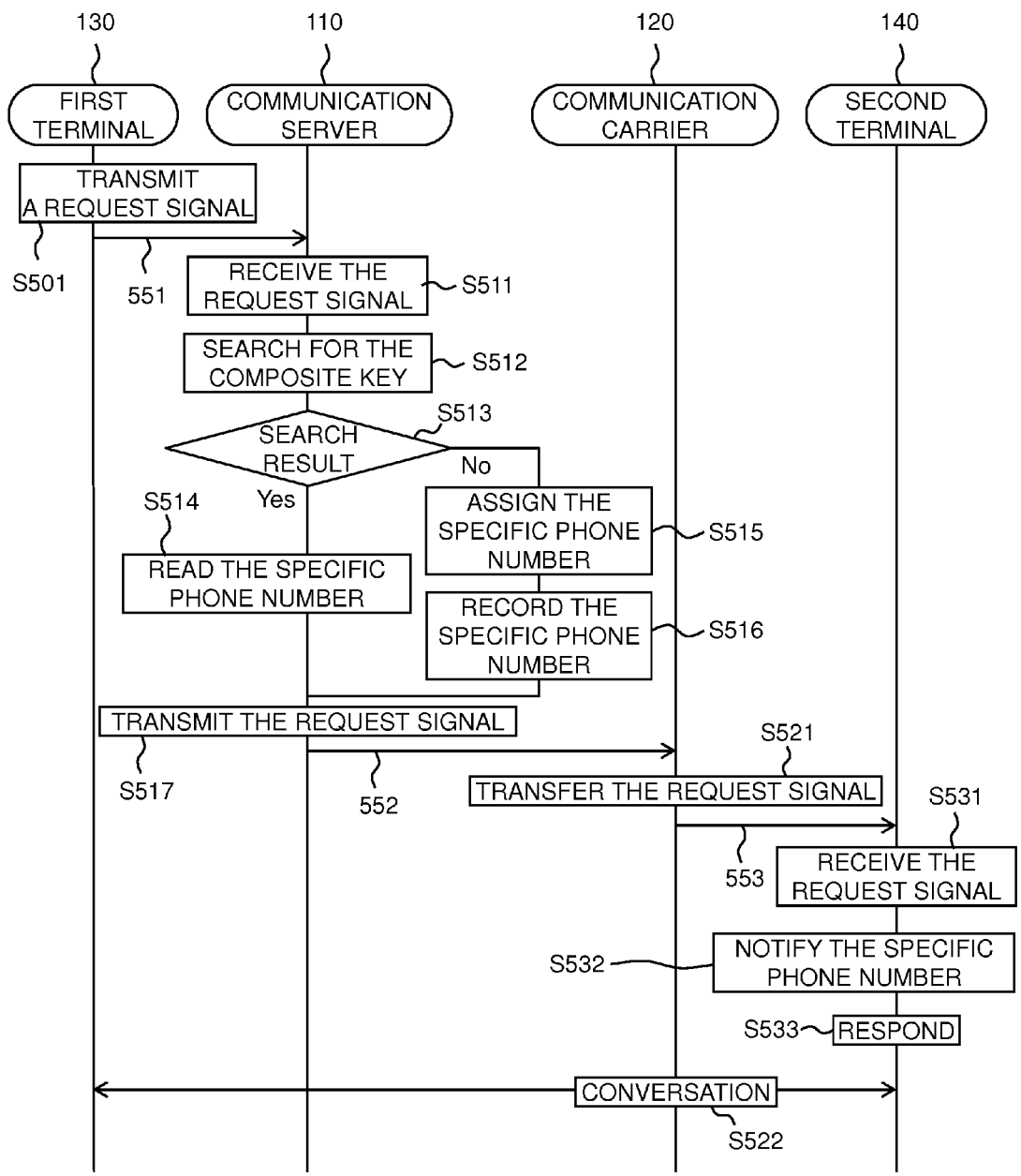
FIG. 5 shows an operation flow of the voice communication system in embodiment 1 according to the present invention.

FIG. 5 shows an operation flow of the voice communication system 100 in embodiment 1 according to the present invention. With reference to the flowchart in FIG. 5, the operation of each of blocks of the voice communication system 100 shown in FIG. 1 will be described in detail.

First, the first terminal 130, which is a transmission terminal, inputs the phone number of the second terminal 140, which is a receiving terminal, to transmit a conversation request signal. By this operation, the first terminal 130 transmits the request signal to the communication server 110 via the IP network 101 (step S501). A first output 551 from the first terminal 130 to the communication server 110 includes the first terminal ID and the second terminal number.

The communication server 110 receives the request signal transmitted in step S501 (step S511). Next, the communication server 110 searches in the database 150 for the combination of the first terminal ID and the second terminal number (composite key) included in the first output 551 (step S512). The process is branched in accordance with the search result in step S512 (step S513). Now, a case where the composite key is detected and a case where the composite key is not detected will be described.

(1) In the Case where the Composite Key is Detected

In the case where the search result in step S513 is "Yes", namely, in the case where the composite key is detected in the database 150, the communication server 110 reads the specific phone number corresponding to the detected composite key from the database 150 (step S514).

(2) In the Case where the Composite Key is not Detected

In the case where the search result in step S513 is "No", namely, in the case where the composite key is not detected in the database 150, the communication server 110 assigns a specific phone number using, as a composite key, the combination of the first terminal ID and the second terminal number included in the output 551 received in step S511 (step S515). Next, the communication server 110 records the specific phone number assigned in step S515 in the TNT table in the database 150 in association with the first terminal ID and the second terminal number (step S516).

As described above, regardless of whether the composite key is detected or not, the communication server 110 acquires the specific phone number. The communication server 110 adds the specific phone number read in step S514 or the specific phone number assigned in step S515 to the request signal instead of, or in addition to, the first terminal ID of the request signal received in step S511. Then, the communication server 110 transmits the resultant request signal to the communication carrier 120 (step S517). A second output 552 from the communication server 110 to the communication carrier 120 includes the second terminal number and the specific phone number.

The communication carrier 120 receives, via the IP network 101, the request signal transmitted in step S517. The communication carrier 120 transfers the request signal to the second terminal 140 via the PSTN 102, using the second terminal number as an addressee (step S521). A third output 553 from the communication carrier 120 to the second terminal 140 includes the specific phone number.

The second terminal 140 receives the request signal transferred in step S521 (step S531). The second terminal 140 displays the specific phone number included in the received request signal on a screen thereof. In this manner, the second terminal 140 notifies the user thereof of the specific phone number (step S532), and thus calls up the user. The user of the second terminal 140, when intending to do the conversation, make an action of accepting the incoming call in response to the call, so that the second terminal 140 responds to the request signal (step S533). The response made in step S533 causes the first terminal 130 and the second terminal 140 to be connected to each other via the communication carrier 120, and thus a conversation starts (step S522).

<Example of Notification of the Specific Phone Number by the Second Terminal 140>

Figure 6:
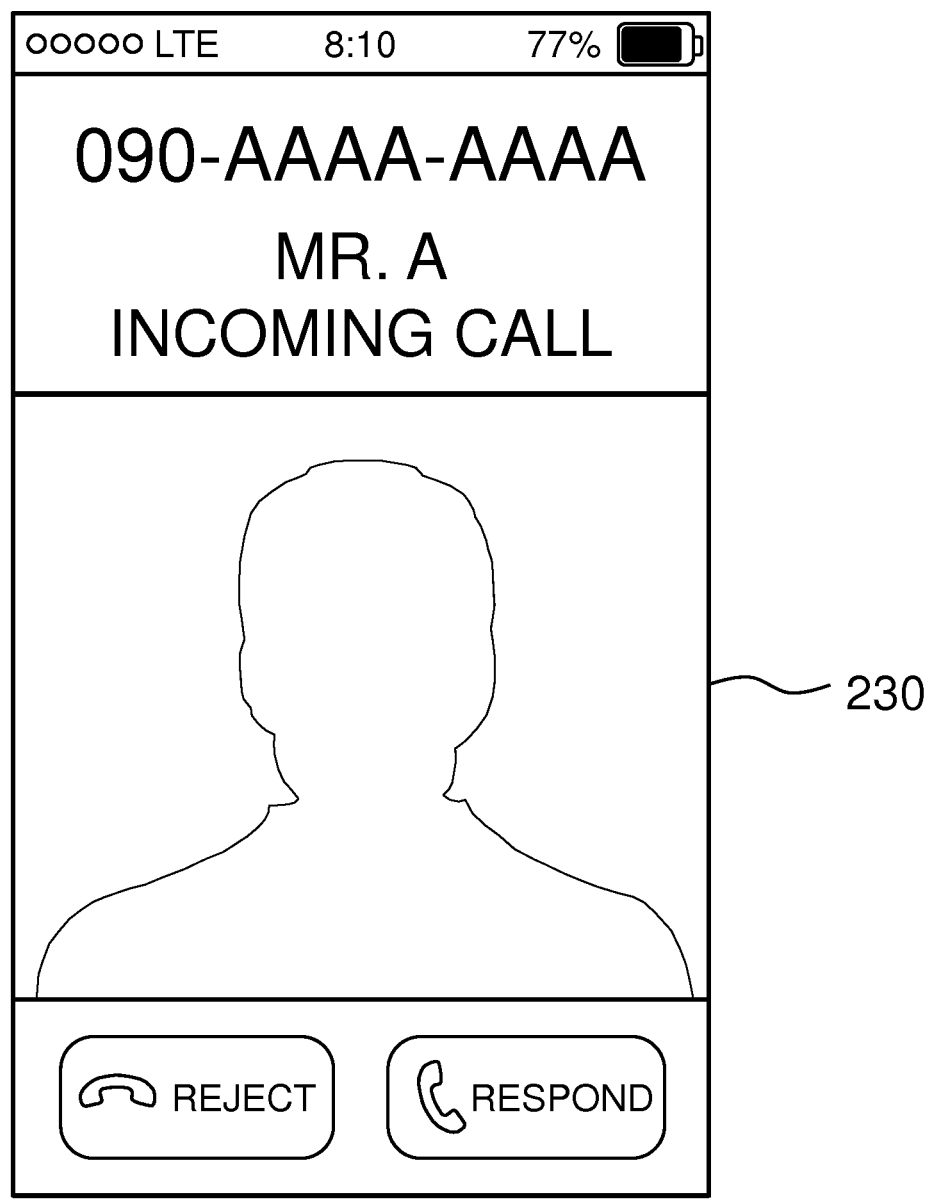
FIG. 6 shows a display screen of a communication terminal usable for the voice communication system in embodiment 1 according to the present invention, the display screen notifying a specific phone number.

Now, with reference to FIG. 6, an example of display of the specific phone number in step S532 shown in FIG. 5 will be described. FIG. 6 shows a display screen of a communication terminal usable for the voice communication system 100 in embodiment 1 according to the present invention. The display screen notifies the specific phone number. The example shown in FIG. 6 is provided in the case where the second terminal 140 has received a conversation request signal from the first terminal 130 via the PSTN 102. The first terminal 130 has an ID "aaa". The second terminal 140 has a phone number "090-XXXX-XXXX". On the display 230 of the second terminal 140, a specific phone number "090-AAAA-AAAA" is displayed. The specific phone number "090-AAAA-AAAA" is assigned to the combination of the first terminal ID "aaa" and the second terminal number "090-XXXX-XXXX". In the example shown in FIG. 6, the specific phone number "090-AAAA-AAAA" and the first terminal 130 have been registered in the database 150 in association with each other, and the second terminal 140 displays, in addition to the specific phone number, a registered name "Mr. A" of the first terminal 130 registered in the second terminal 140. In the example shown in FIG. 6, both of the specific phone number and the registered name are displayed. The present invention is not limited to this, and only the registered name may be displayed.

<TNT Table Stored in the Database 150>

FIG. 7 shows an example of TNT table stored in the database 150 in the voice communication system 100 in embodiment 1 according to the present invention. With reference to FIG. 7, the TNT table in which a specific phone number is assigned to a composite key, which is a combination of an ID and a phone number of different communication terminals, will be described.

The database 150 includes a TNT table 600 as shown in FIG. 7. The TNT table 600 includes at least a first terminal ID 601, a second terminal number 602, and a specific phone number 603. As shown in a first row 611 through a ninth row 619, a first terminal ID 601, a second terminal number 602 and a specific phone number 603 are associated with one another. Namely, a specific phone number 603 is assigned, with a combination of a first terminal ID 601 and a second terminal number 602 being used as a composite key. In other words, a specific phone number 603 is a number with which the second terminal 140, which is a receiving terminal, specifies the first terminal 130, which is a transmission terminal.

One, same number may be assigned as the specific phone number 603 to different combinations of first terminal IDs and second terminal numbers. For example, as shown in the first row 611, the fourth row 614 and the seventh row 617 of FIG. 7, the same specific phone number 603 "090-AAAA-AAAA" is assigned to different combinations of first terminal IDs 601 and second terminal numbers 602.

This will be described more specifically. Referring to the first row 611, the specific phone number "090-AAAA-AAAA" indicates the first terminal ID "aaa" for the second terminal number "090-XXXX-XXXX". Referring to the fourth row 614, the specific phone number "090-AAAA-AAAA" indicates the first terminal ID "ddd" for the second terminal number "090-YYYY-YYYY". Referring to the seventh row 617, the specific phone number "090-AAAA-AAAA" indicates the first terminal ID "ccc" for the second terminal number "090-ZZZZ-ZZZZ".

As can be seen from the first row 611 and the eighth row 618, one, same first terminal ID "aaa" is assigned different specific phone numbers when being combined with different second terminal numbers. For example, referring to the first row 611, the specific phone number "090-AAAA-AAAA" is assigned to the first terminal ID "aaa" combined with the second terminal number "090-XXXX-XXXX". Referring to the eighth row 618, the specific phone number "090-BBBB-BBBB" is assigned to the first terminal ID "aaa" combined with the second terminal number "090-ZZZZ-ZZZZ".

As described above, the voice communication system in embodiment 1 according to the present invention includes a TNT table in which a specific phone number is assigned, with a combination of a first terminal ID of the first terminal 130 as a transmission terminal and a second terminal number of the second terminal 140 as a receiving terminal being used as a composite key. The voice communication system includes the TNT table, and therefore can assign one, same specific phone number to a plurality of combinations of first terminal IDs and second terminal numbers. Namely, it is not necessary that different phone numbers should be assigned to a plurality of first terminal IDs. Therefore, in a communication service for connecting communication terminals via the VoIP and the PSTN, a plurality of transmission terminals and receiving terminals can be managed with a small number of phone numbers.

Embodiment 2

With reference to the drawings, a voice communication system in embodiment 2 according to the present invention, and a communication server and a communication terminal also in embodiment 2 according to the present invention usable for the voice communication system will be described in detail.

<Overview of the System>

Figure 8:
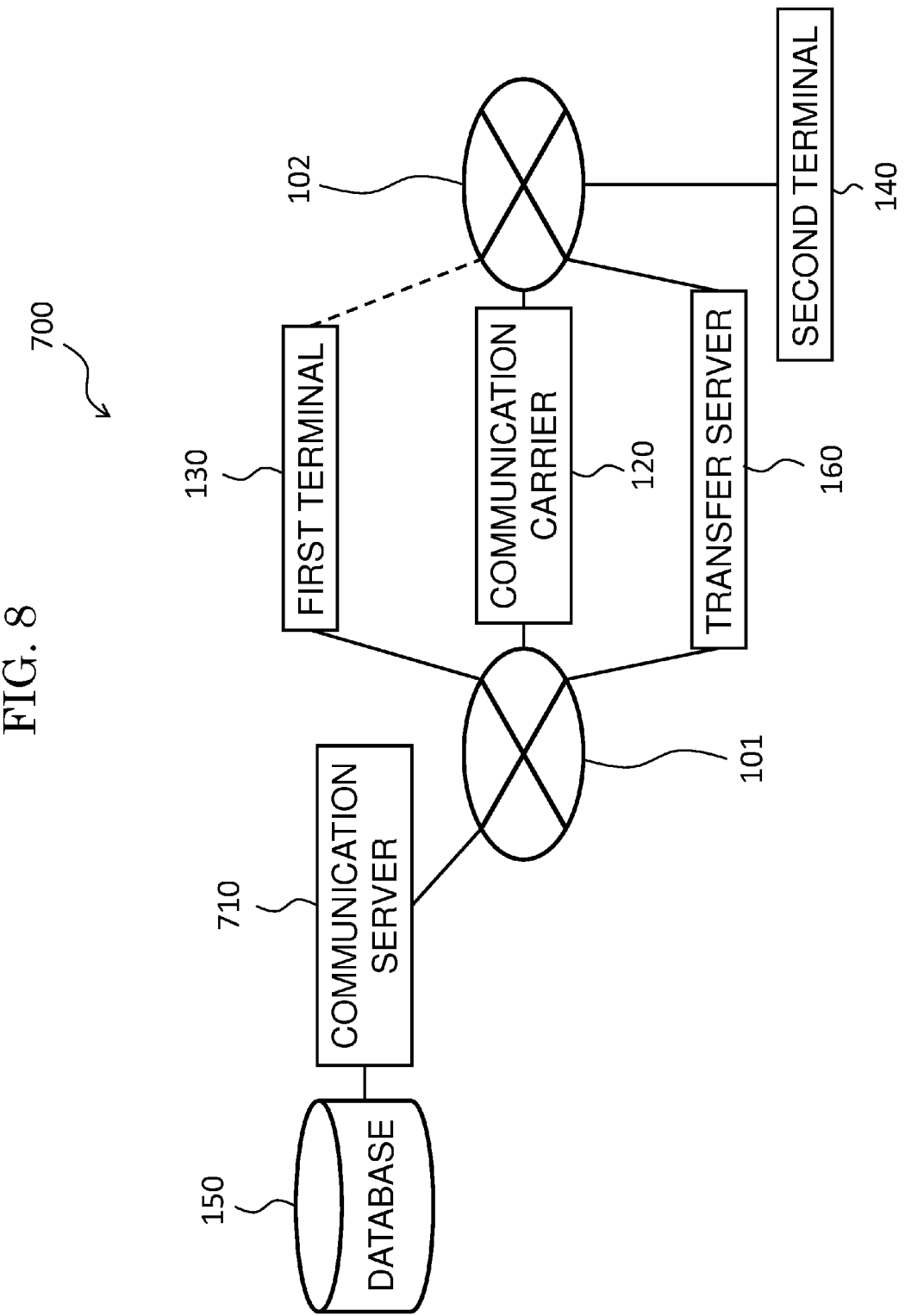
FIG. 8 is a block diagram showing a structure of a voice communication system in embodiment 2 according to the present invention.

FIG. 8 is a block diagram showing a structure of a voice communication system 700 in embodiment 2 according to the present invention. The voice communication system 700 shown in FIG. 8 is similar to the voice communication system 100 shown in FIG. 1, but is different therefrom in that the voice communication system 700 includes a transfer server 160 connected to the IP network 101 and to the PSTN 102.

The transfer server 160 transfers information to a designated terminal. Specifically, the transfer server 160 is a server that transfers information, received from a communication server 710, to the second terminal 140 in the form of a message by use of a communication measure represented by a short message service (SMS). The transfer server 160 may be an SMS server. Information which may be transferred by the transfer server 160 in the form of a message is, for example, a first terminal number, which is a phone number of the first terminal 130. The transfer server 160 may be separate from the communication server 710 as shown in FIG. 8, or the communication server 710 may have a function of the transfer server 160. In the case where the communication server 710 has a function of the transfer server 160, the communication server 710 is connected to the PSTN 102.

<Functional Structure of the Communication Server>

Figure 9:
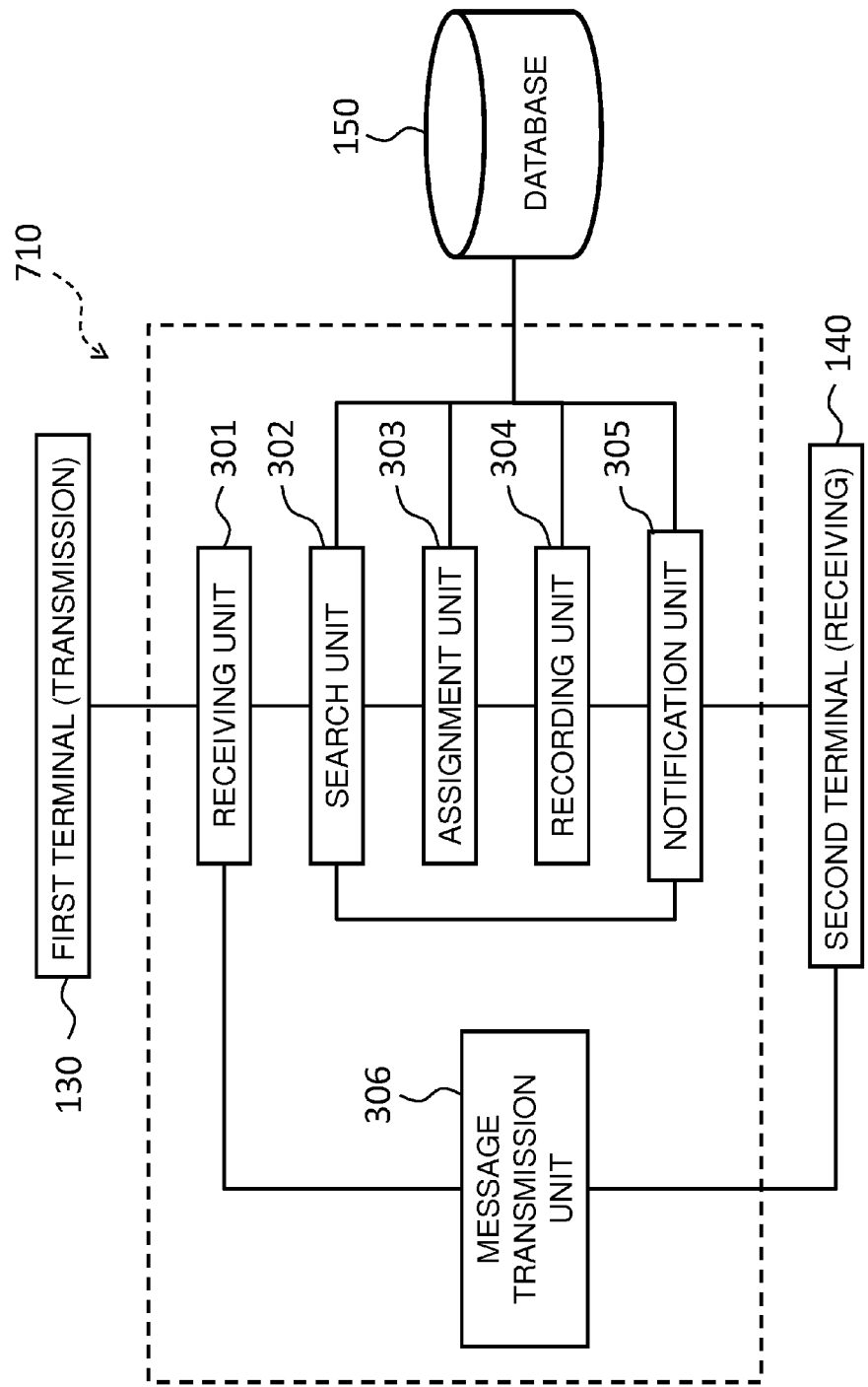
FIG. 9 is a block diagram showing a functional structure of a communication server in the voice communication system in embodiment 2 according to the present invention.

FIG. 9 is a block diagram showing a functional structure of the communication server 710 in the voice communication system 700 in embodiment 2 according to the present invention. The communication server 710 shown in FIG. 9 is similar to the communication server 110 shown in FIG. 4, but is different therefrom in that the communication server 710 includes a message transmission unit 306.

The message transmission unit 306 transmits, in the form of a message, the first terminal number included in the request signal transmitted by the first terminal or a message designated by the first terminal 130 to the second terminal 140. In more detail, the message transmission unit 306 transmits, in the form of a message, the first terminal number or a designated message to the transfer server 106 via the IP network 101. Then, the transfer server 160 transfers the transmitted first terminal number or designated message to the second terminal 140 via the PSTN 102 by use of a measure such as, for example, an SMS.

The message transmission unit 306 may be connected to the database 150. In the above example, the first terminal number is included in the request signal. Alternatively, the first terminal number may not be included in the request signal. For example, the first terminal number associated with the first terminal ID may be read from the database 150 based on the first terminal ID included in the request signal. In addition to, or instead of, the first terminal number, other information on the first terminal 130 stored in the database 150 may be read and transmitted to the second terminal 140.

In the case where the communication terminal 200 shown in FIG. 3 is used as the first terminal 130, which is a transmission terminal, the memory included in the control unit 210 may store the first terminal number, which is the phone number of the first terminal 130 in the PSTN 102. The communication module 220 transmits the first terminal number to the communication server 710 via the IP network 101. The first terminal number received by the communication server 710 is transmitted to the transfer server 160 in the form of a message. Then, the first terminal number in the form of a message is transferred to the second terminal 140 from the transfer server 160 to be notified to the second terminal 140. The first terminal number transferred to the second terminal 140 in the form of a message is received by the communication module 220 included in the second terminal 140.

<Operation Flow of the Voice Communication System>

Figure 10:
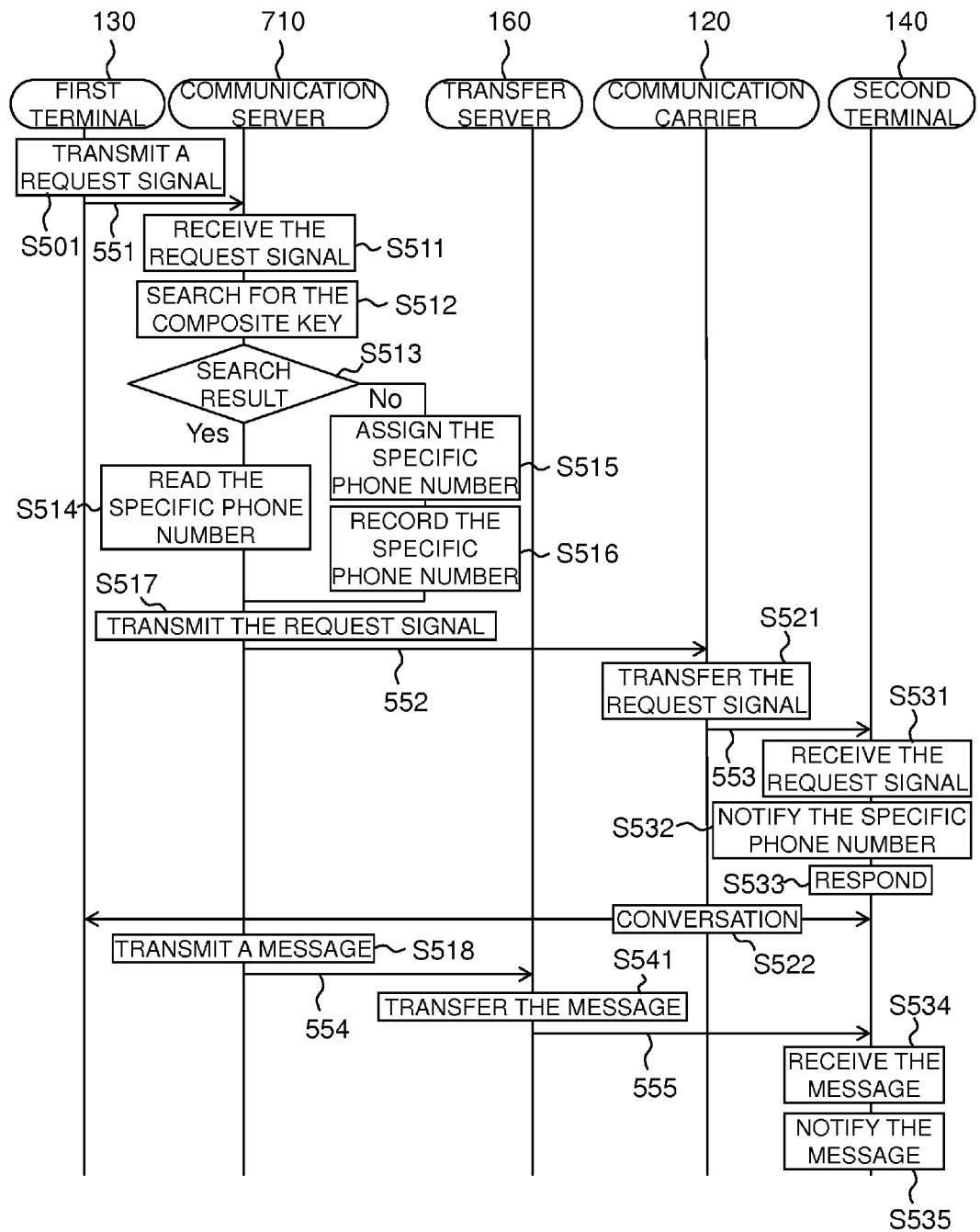
FIG. 10 shows an operation flow of the voice communication system in embodiment 2 according to the present invention.

FIG. 10 shows an operation flow of the voice communication system 700 in embodiment 2 according to the present invention. With reference to the flowchart in FIG. 10, the operation of each of blocks of the voice communication system 700 shown in FIG. 8 will be described in detail. In FIG. 10, the flow up to the conversation in step S522 is substantially the same as that in FIG. 5, and will not be described. The flow after the conversation in step S522 will be described. In the example described below with reference to FIG. 10, the first terminal number is transmitted to the second terminal 140 in the form of a message.

As shown in FIG. 10, after the conversation in step S522, the communication server 710 transmits the first terminal number included in the request signal received in step S511 to the transfer server 160 in the form of a message (step S518). In the case where the first terminal number is not included in the request signal, a step of reading the first terminal number associated with the first terminal ID from the database 150 based on the first terminal ID included in the request signal may be provided between step S511 and step S518. The communication server 710 may notify the first terminal 130 that the communication server 710 has transmitted the first terminal number to the transfer server 160 in the form of a message. A fourth output 554 from the communication server 710 to the transfer server 160 includes the first terminal number and the second terminal number.

The transfer server 160 receives the first terminal number and the second terminal number transmitted in step S518 via the IP network 101. The transfer server 160 transfers the first terminal number to the second terminal 140 in the form of a message via the PSTN 102, using the second terminal number as an addressee (step S541). A fifth output 555 from the transfer server 160 to the second terminal 140 includes the first terminal number.

The second terminal 140 receives the first terminal number transferred in the form of a message in step S541 (step S534). Next, the second terminal 140 notifies the user of the second terminal 140 of the received first terminal number in the form of a message (step S535).

In the example shown in FIG. 10, the transmission of the first terminal number in the form of a message in step S518 is performed after the conversation in step S522. The present invention is not limited to this. The transmission of the first terminal number in the form of a message in step S518 may be performed at any time after the first terminal number is received from the first terminal 130 or read from the database 150. For example, the transmission of the first terminal number in the form of a message in step S518 may be performed before the conversation in step S522, at the same time with the transmission of the request signal in step S517, or before the transmission of the request signal in step S517. In the case where the transmission of the first terminal number in the form of a message in step S518 is performed before the transmission of the request signal in step S517, the notification of the first terminal number in the form of a message in step S535 may be performed before the second terminal 140 is called up in response to the request signal.

In the example shown in FIG. 10, the phone number of the first terminal 130 is transmitted to the second terminal 140 in the form of a message. The present invention is not limited to this. For example, the message transmitted to the second terminal 140 may be the first terminal ID, a message designated by the first terminal 130, a nickname of the first terminal 130 in the SNS that is recorded in the database 150, or the like.

<Example of Notification of the Message by the Second Terminal 140>

Figure 11:
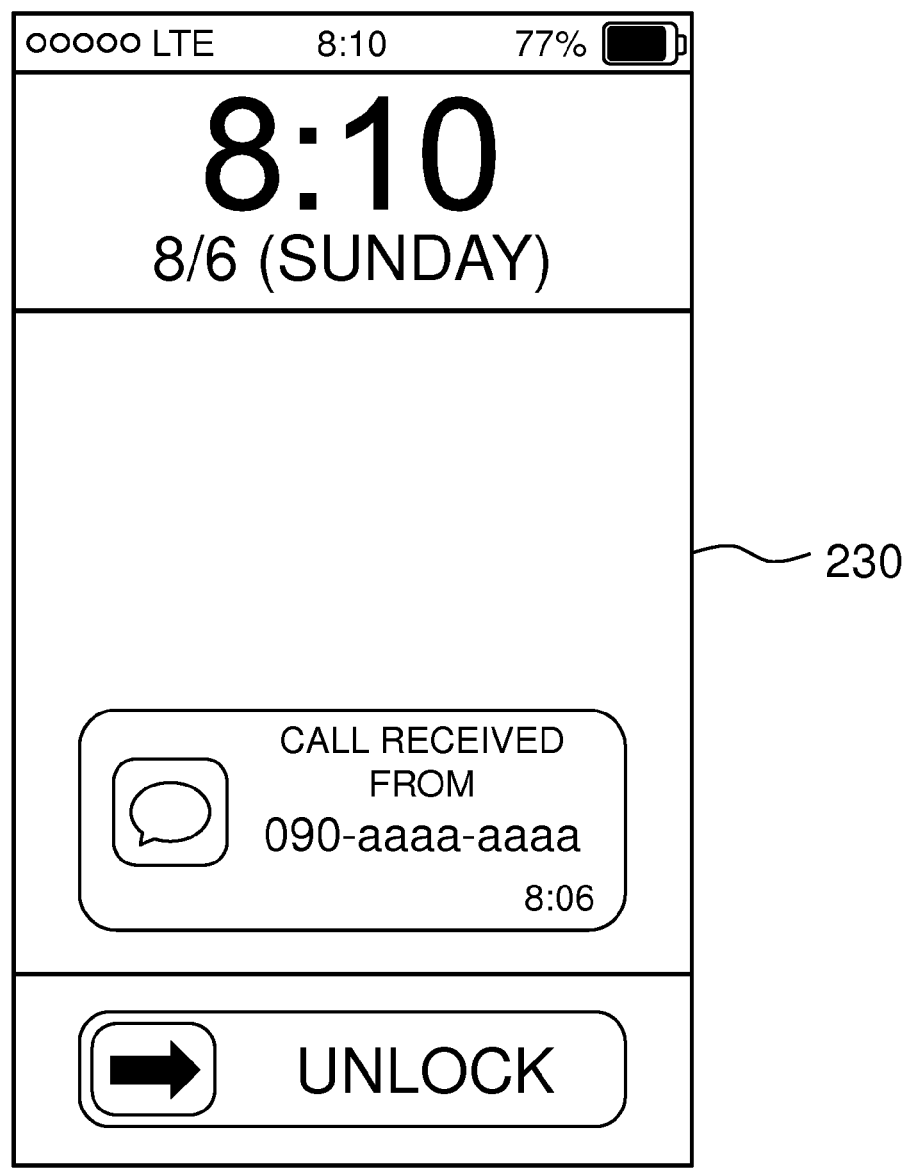
FIG. 11 shows a display screen of a communication terminal usable for the voice communication system in embodiment 2 according to the present invention, the display screen notifying a message.

Now, with reference to FIG. 11, an example of display of the notification of the first terminal number in the form of a message in step S535 shown in FIG. 10 will be described. FIG. 11 shows a display screen of a communication terminal usable for the voice communication system 700 in embodiment 2 according to the present invention. The display screen notifies the message. The example shown in FIG. 11 is provided in the case where the second terminal 140 has received a conversation request signal from the first terminal 130 via the PSTN 102. The first terminal 130 has an ID "aaa" and a phone number "090-aaaa-aaaa". The second terminal 140 has a phone number "090-XXXX-XXXX". On the display 230 of the second terminal 140, the first terminal number "090-aaaa-aaaa" is displayed in the form of a message after the conversation in step S522 shown in FIG. 10.

With the voice communication system 100 in embodiment 1, in the case where the first terminal 130 transmits a conversation request signal to the second terminal 140 via the IP network 101, the first terminal number, even if being owned by the first terminal 130, is not displayed on the second terminal 140 (the specific phone number is displayed). By contrast, with the voice communication system 700 in embodiment 2, the first terminal number is transmitted to the second terminal 140 in the form of a message separately from the conversation request signal, so that the first terminal number can be notified to the second terminal 140. In the example shown in FIG. 11, the first terminal number is displayed on the second terminal 140 in the form of a message. The present invention is not limited to this. For example, the first terminal ID, a message designated by the first terminal 130, a nickname of the first terminal 130 in the SNS that is recorded in the database 150, or the like may be transmitted.

As described above, with the voice communication system 700 in embodiment 2 according to the present invention, like in embodiment 1, a plurality of transmission terminals and receiving terminals can be managed with a small number of phone numbers in a communication service for connecting communication terminals via the VoIP and the PSTN. In addition, even in the case where the specific phone number specifying the first terminal is not registered in the second terminal, information on the first terminal can be notified to the second terminal in the form of a message.

Embodiment 3

An operation flow of a voice communication system 100 in embodiment 3 according to the present invention will be described with reference to the drawings. In embodiment 3, the operation flow in the case where the second terminal 140 which has received the specific phone number in embodiment 1 transmits a response to the notified specific phone number will be described. The overview of the voice communication system 100 and the hardware structure of the communication server are substantially the same as those in embodiment 1. Unlike in embodiment 1 and embodiment 2, the communication terminal of a transmitting user who transmits a conversation request signal will be referred to as the "second terminal 140", and the communication terminal of a receiving user who receives the request signal will be referred to as the "first terminal 130".

<Functional Structure of the Communication Server>

Figure 12:
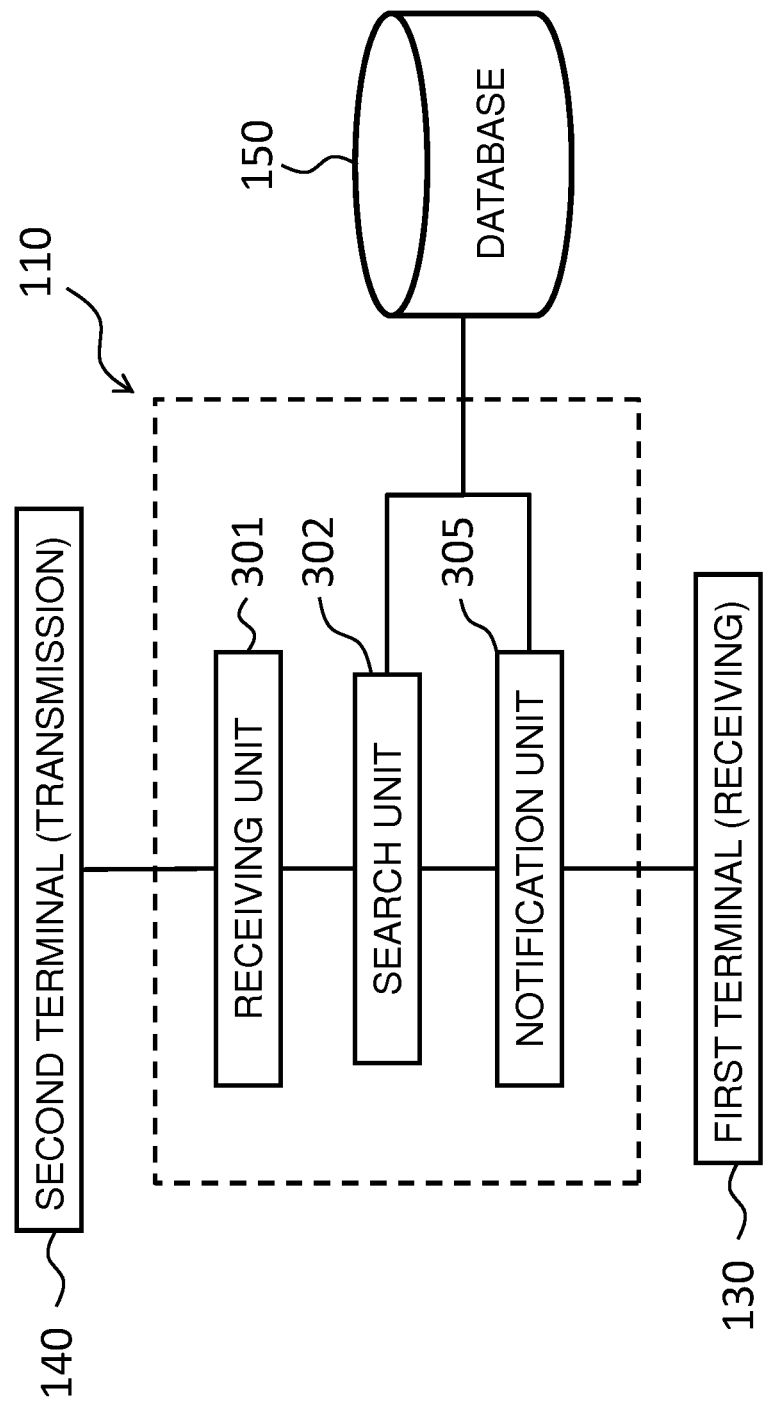
FIG. 12 is a block diagram showing a functional structure of a communication server in a voice communication system in embodiment 3 according to the present invention.

FIG. 12 is a block diagram showing a functional structure of the communication server 110 in the voice communication system 100 in embodiment 3 according to the present invention. With reference to FIG. 12, each of functions of the communication server 110 shown in FIG. 1 will be described in more detail. As shown in FIG. 12, the communication server 110 includes at least the receiving unit 301, the search unit 302, the notification unit 305. The communication server 110 shown in FIG. 12 may use a part of the functional blocks shown in FIG. 4.

The blocks in the communication server 110 in embodiment 3 shown in FIG. 12 are substantially the same as those in the communication server 110 shown FIG. 4, but some functions of the blocks are different. For example, in embodiment 3, the receiving unit 301 receives a second terminal number, which is a phone number of the second terminal 140 for transmitting a conversation request signal, and a specific phone number specifying the first terminal 130 for receiving the conversation request signal. The second terminal number and the specific phone number are received from the second terminal 140 via the communication carrier 120 including a gateway between the PSTN 102 and the IP network 101. The receiving unit 301 outputs the received second terminal number and specific phone number to the search unit 302.

The search unit 302 receives the second terminal number and the specific phone number output from the receiving unit 301. The search unit 302 searches, in the database 150, for the first terminal ID. The first terminal ID is the ID in the SNS of the first terminal 130 and is related to the second terminal number and the specific phone number. The database 150 includes a plurality of phone numbers of a plurality of terminals in the PSTN, a plurality of IDs of a plurality of terminals in the SNS, and specific phone numbers associated with the plurality of phone numbers of the plurality of terminals and the plurality of IDs of the plurality of terminals. Herein, the expression that "the 'first terminal ID' is related to the 'specific phone number specifying the first terminal' and the 'second terminal number'" indicates that the "specific phone number specifying the first terminal" is assigned, with a combination of the "first terminal ID" and the "second terminal number" being used as a composite key. In other words, the "first terminal ID" is searched for, with a combination of the "specific phone number specifying the first terminal" and the "second terminal number" being used as a composite key. Upon detection of the first terminal ID, the search unit 302 outputs, to the notification unit 305, a signal indicating that the composite key corresponding to the combination of the "first terminal ID" and the "second terminal number" is present in the database 150.

Upon receipt of the signal indicating that the composite key is present in the database 150 from the search unit 302, the notification unit 305 transmits the second terminal number to the first terminal 130 based on an IP address assigned to the first terminal ID, which is a part of the composite key. The notification unit 305 may notify the second terminal number to the first terminal 130 via the SNS.

Now, the control unit 210 in the case where the communication terminal 200 shown in FIG. 3 is used as the second terminal 140, which is a transmission terminal in embodiment 3, will be described in detail. The communication terminal 200 includes the control unit 210 and the communication module 220.

The control unit 210 includes the CPU that executes a program in accordance with a command signal, and a memory storing the specific phone number specifying the first terminal 130 and the second terminal number. The specific phone number is a phone number specifying the first terminal 130 that receives the conversation request signal, and the second terminal number is a phone number in the PSTN of the second terminal 140 that transmits the conversation request signal. The CPU realizes any of various functions of the communication terminal 200 in accordance with a command signal input by the user.

The communication module 220 is controlled by the control unit 210 to transmit the specific phone number and the second terminal number to the communication server 110 via the communication carrier 120. The communication carrier 120 includes a gateway between the IP network 101 and the PSTN 102. The communication server 110 is connected to the database 150. The database 150 stores a first terminal ID and a second terminal number in association with a specific phone number. In other words, the database 150 includes a TNT table in which the first terminal ID, the second terminal number and the specific phone number are associated to one another. The communication server 110 transmits the request signal to the first terminal 130 via the IP network 101 based on the first terminal ID that is related to the received specific phone number and second terminal number and is acquired from the database 150. In this manner, the first terminal 130 and the second terminal 140 are connected to each other via the communication carrier 120.

<Operation Flow of the Voice Communication System>

Figure 13:
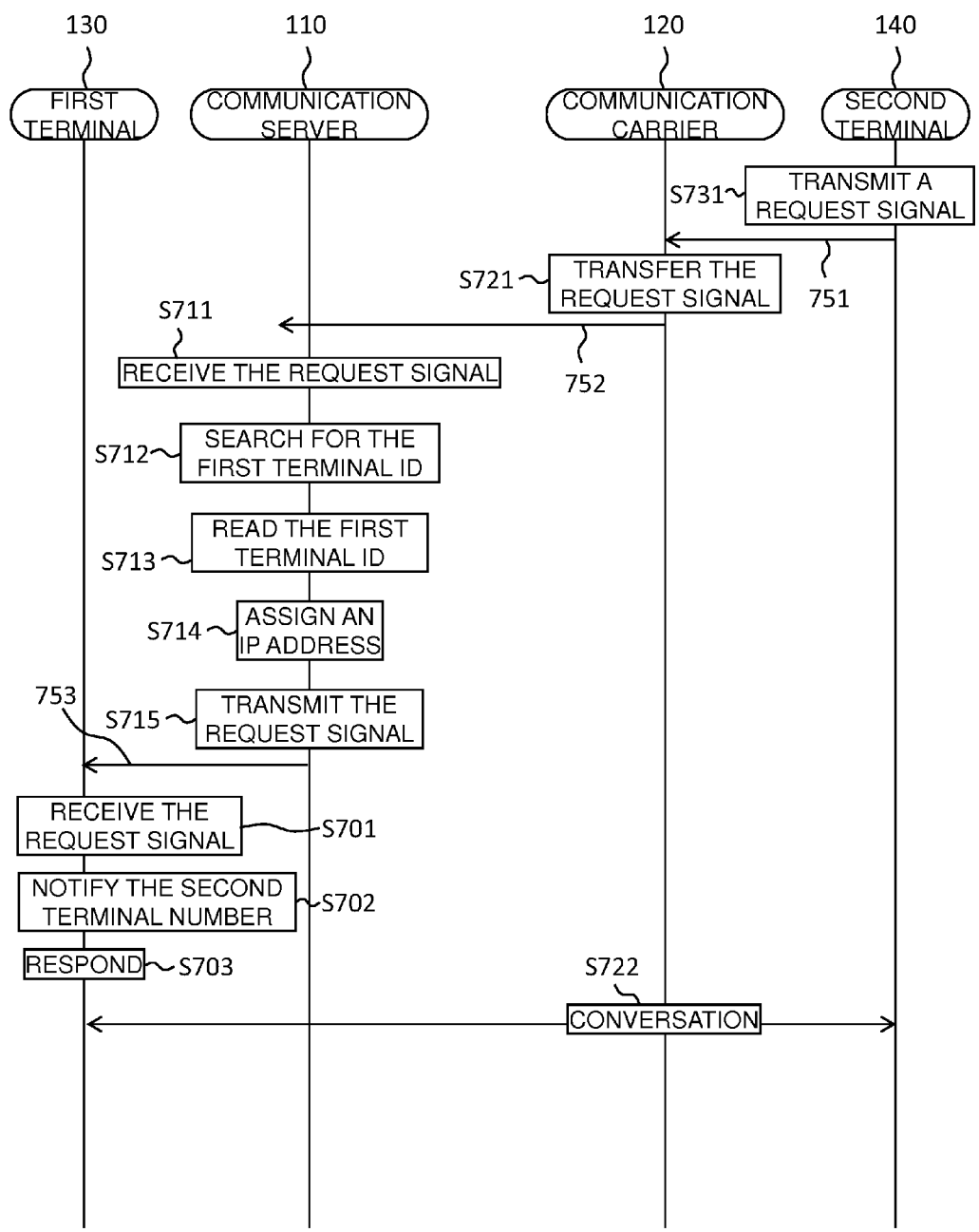
FIG. 13 shows an operation flow of the voice communication system in embodiment 3 according to the present invention.

FIG. 13 shows an operation flow of the voice communication system 100 in embodiment 3 according to the present invention. With reference to the flowchart in FIG. 13, the operation of each of blocks of the voice communication system 100 shown in FIG. 1 will be described in detail. Unlike in FIG. 5, in FIG. 13, the transmission terminal is the second terminal 140, and the receiving terminal is the first terminal 130.

First, the second terminal 140, which is a transmission terminal, inputs the specific phone number specifying the first terminal 130 that has been notified to the second terminal 140 in step S532 shown in FIG. 5, and thus transmits a conversation request signal. By this operation, the second terminal 140 transmits the request signal to the communication carrier 120 via the PSTN 102 (step S731). A first output 751 from the second terminal 140 to the communication carrier 120 includes the specific phone number specifying the first terminal 130 and the second terminal number.

The communication carrier 120 receives the request signal transmitted in step S731 via the PSTN 102, and transfers the request signal to the communication server 110 via the IP network 101 (step S732). A second output 752 from the communication carrier 120 to the communication server 110 includes the specific phone number specifying the first terminal 130 and the second terminal number.

The communication server 110 receives the request signal transferred in step S721 (step S711). Next, the communication server 110 searches, in the database 150, for the first terminal ID related to the specific phone number, specifying the first terminal 130, and the second terminal number that are included in the second output 752 (step S712). The communication server 110 reads the detected first terminal ID from the database 150 (step S713).

Next, the communication server 110 assigns an IP address in the IP network 101 to the first terminal 130 based on the first terminal ID read in step S713 (step S714). Then, the communication server 110 transmits the request signal received in step S711 to the first terminal 130 having the IP address assigned in step S714 (step S715). A third output 753 from the communication server 110 to the first terminal 130 includes the second terminal number.

The first terminal 130 receives the request signal transmitted in step S715 (step S701). The first terminal 130 displays the second terminal number included in the received request signal on a screen thereof. In this manner, the first terminal 130 notifies the user thereof of the second terminal number (step S702), and thus calls up the user. The user of the first terminal 130, when intending to do the conversation, make an action of accepting the incoming call in response to the call, so that the first terminal 130 responds to the request signal (step S703). The response made in step S703 causes the first terminal 130 and the second terminal 140 to be connected to each other via the communication carrier 120, and thus a conversation starts (step S722).

output

<Example of Notification of the Terminal Number of the Transmission Terminal by the First Terminal 130>

Figure 14:
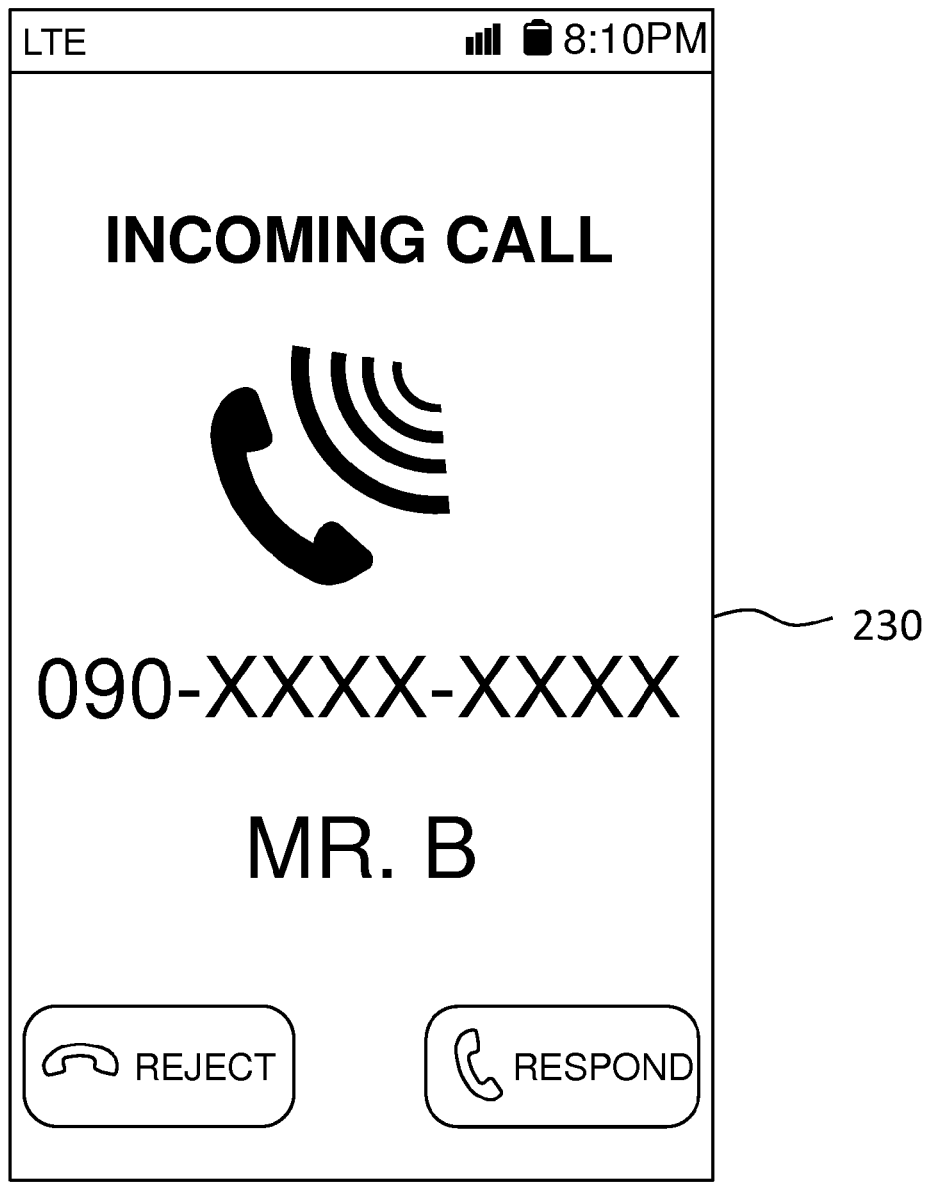
FIG. 14 shows a display screen of a communication terminal usable for the voice communication system in embodiment 3 according to the present invention, the display screen notifying a transmission terminal number.

Now, with reference to FIG. 14, an example of display of the notification of the second terminal number in step S702 shown in FIG. 13 will be described. FIG. 14 shows a display screen of a communication terminal usable for the voice communication system 100 in embodiment 3 according to the present invention. The display screen notifies the second terminal number, namely, the number of the transmission terminal (second terminal 140). The example shown in FIG. 14 is provided in the case where the first terminal 130 has received a conversation request signal from the second terminal 140 via the IP network 101. The first terminal 130 has an ID "aaa". The second terminal 140 has a phone number "090-XXXX-XXXX". On the display 230 of the first terminal 130, the second terminal number "090-XXXX-XXXX" is displayed. In the example shown in FIG. 14, the second terminal number "090-XXXX-XXXX" and the second terminal 140 have been registered in the database 150 in association with each other, and the first terminal 130 displays, in addition to the second terminal number, a registered name "Mr. B" of the second terminal 140 registered in the first terminal 130. In the example shown in FIG. 14, both of the second terminal number and the registered name are displayed. The present invention is not limited to this, and only the registered name may be displayed.

As described above, with the voice communication system in embodiment 3 according to the present invention, even in the case where a return call is made to the specific phone number, the conversion can be made, and information on the transmission terminal can be notified.

Embodiment 4

FIG. 15 is a block diagram showing a functional structure of a communication server 910 in a voice communication system in embodiment 4 according to the present invention. In embodiment 4, a method for maintaining the specific phone number even in the case where the phone number of a communication terminal is changed.

The communication server 910 shown in FIG. 15 is similar to the communication server 710 shown in FIG. 9, but is different therefrom in that the communication server 910 includes a phone number management unit 307. In the case where, for example, the user of the second terminal 140 changes the phone number of the second terminal 140, the phone number management unit 307 provides an interface usable to switch the second terminal number in the database 150 from the pre-change phone number to the post-change phone number based on a notice of the number change from the user of the second terminal 140. In this example, the phone number of the second terminal 140 is changed. Alternatively, in the case where the user of the first terminal 130 changes the phone number of the first terminal 130, the phone number management unit 307 may provide an interface usable to switch the first terminal number in the database 150 from the pre-change phone number to the post-change phone number based on a notice of the number change from the user of the first terminal 130.

As described above, the phone number management unit switches the terminal number in the database 150 based on a notice from the user, so that the only the phone number which has been changed is switched in the TNT table. Namely, in the case where only the phone number of the first terminal or the second terminal is changed, the specific phone number assigned to the combination of the first terminal and the second terminal can be kept used.

The present invention is not limited to the above-described embodiments, and the above-described embodiments may be modified in various manners without departing from the gist of the present invention.

What is claimed is:

1. A communication server, comprising:
   a receiving unit configured to receive a first terminal ID and a second terminal number from a first terminal transmitting a conversation request signal via an IP network, the second terminal number being a phone number in a PSTN (public switched telephone network) of a second terminal receiving the conversation request signal;
   a search unit configured to search for a specific phone number for the first terminal in use of the first terminal ID and the second terminal number in a database, the database comprising a plurality of phone numbers of a plurality of terminals, a plurality of ID information for the plurality of terminals, and specific phone numbers associated with the plurality of phone numbers and the plurality of ID information;
   a notification unit configured to notify the second terminal of the specific phone number;
   an assignment unit configured to, in a case when the specific phone number cannot be specified by the search unit, assign a specific phone number in association with the first terminal ID and the second terminal number; and
   a recording unit configured to record the first terminal ID, the second terminal number and the specific phone number in the database.

2. The communication server according to claim 1, wherein:
   the first terminal ID comprises inherent information used for identifying a corresponding terminal.

3. The communication server according to claim 1, wherein the notification unit, upon detection of the specific phone number, notifies the second terminal of the specific phone number using the second terminal number as an addressee.

4. The communication server according to claim 1, wherein the notification unit transmits the specific phone number to a communication carrier including a gateway between the PSTN and the IP network, using the second terminal number.

5. The communication server according to claim 1, further comprising a message transmission unit configured to transmit a first terminal number to the second terminal in the form of a message via an SMS server, the first terminal number being a phone number of the first terminal in the PSTN.

6. The communication server according to claim 1, further comprising a phone number management unit configured to switch the first terminal ID or the second terminal number in the database based on a notice from a user of the first terminal or a user of the second terminal.

7. A method of communication, comprising:
   receiving a first terminal ID and a second terminal number from a first terminal transmitting a conversation request signal via an IP network, the second terminal number being a phone number in a PSTN (public switched telephone network) of a second terminal receiving the conversation request signal;
   searching for a specific phone number for the first terminal in use of the first terminal ID and the second terminal number in a database, the database comprising a plurality of phone numbers of a plurality of terminals, a plurality of ID information for the plurality of terminals, and specific phone numbers associated with the plurality of phone numbers and the plurality of ID information;
   notifying the second terminal of the specific phone number;
   assigning a specific phone number in association with the first terminal ID and the second terminal number, in a case when the specific phone number cannot be specified; and
   recording the first terminal ID, the second terminal number and the specific phone number in the database.

8. The method of communication according to claim 7, wherein the first terminal ID comprises inherent information used for identifying a corresponding terminal.

9. The method of communication according to claim 7, wherein notifying the second terminal of the specific phone number includes notifying, upon detection of the specific phone number, the second terminal of the specific phone number using the second terminal number as an addressee.

10. The method of communication according to claim 7, further comprising:
    transmitting the specific phone number to a communication carrier including a gateway between the PSTN and the IP network, using the second terminal number.

11. The method of communication according to claim 7, further comprising:
    transmitting a first terminal number to the second terminal in the form of a message via an SMS server, the first terminal number being a phone number of the first terminal in the PSTN.

12. The method of communication according to claim 7, further comprising:
    switching the first terminal ID or the second terminal number in the database based on a notice from a user of the first terminal or a user of the second terminal.

* * * * *